(No Model.) 2 Sheets—Sheet 1.
J. H. HANSON.
HARROW.
No. 463,718. Patented Nov. 24, 1891.
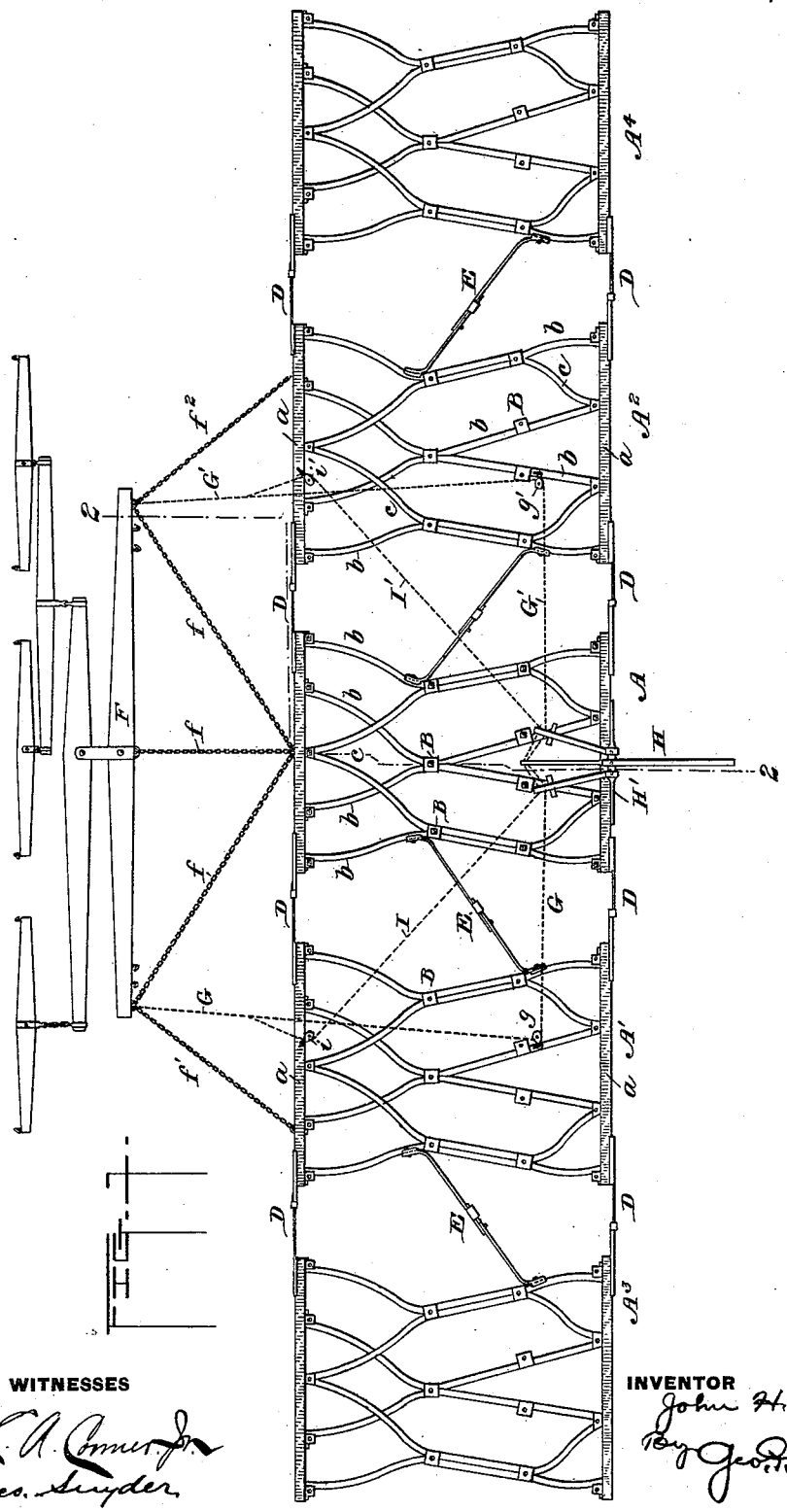
WITNESSES
INVENTOR (No Model.) 2 Sheets—Sheet 2.
J. H. HANSON.
HARROW.
No. 463,718. Patented Nov. 24, 1891.
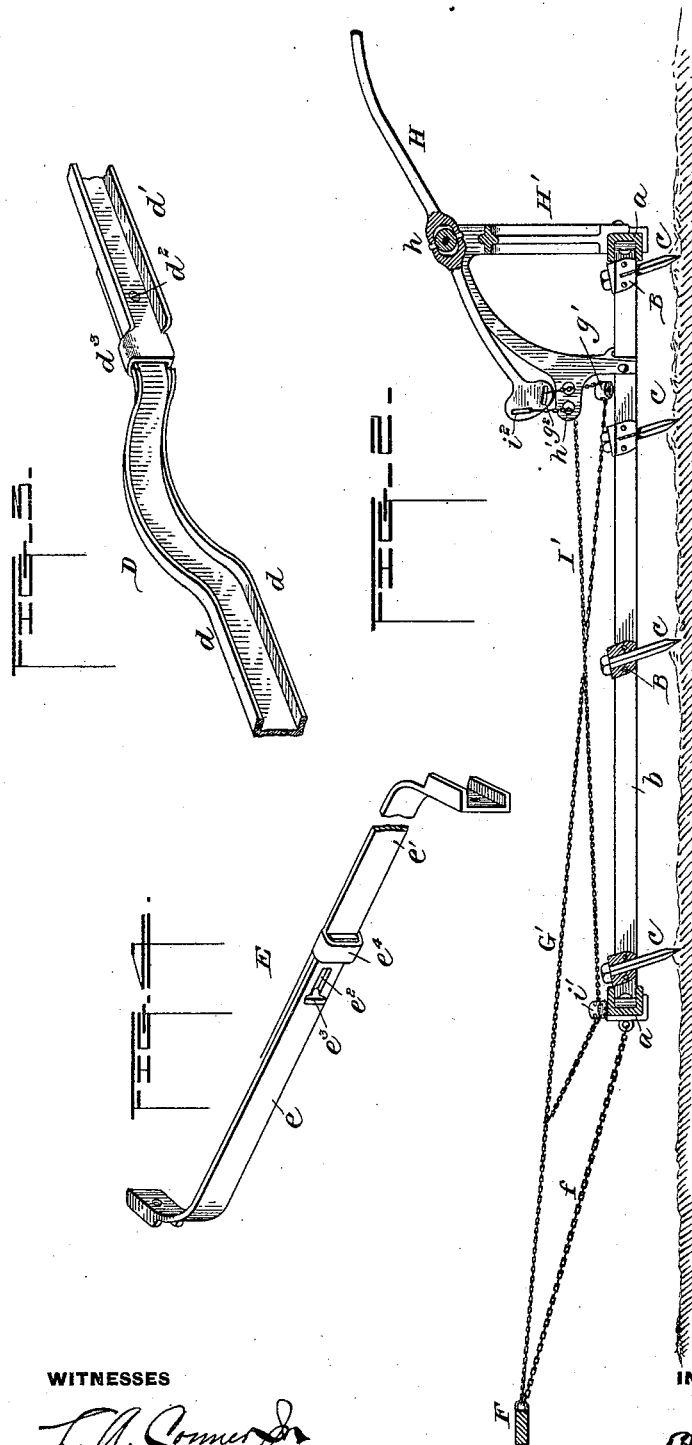
WITNESSES
INVENTOR
John H. Hanson

UNITED STATES PATENT OFFICE.

JOHN H. HANSON, OF OAKLAND, NEBRASKA.

HARROW.

SPECIFICATION forming part of Letters Patent No. 463,718, dated November 24, 1891.

Application filed November 5, 1890. Serial No. 370,399. (No model.)

*To all whom it may concern:*

Be it known that I, JOHN H. HANSON, a citizen of the United States, residing at Oakland, in the county of Burt and State of Nebraska, have invented certain new and useful Improvements in Harrows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to agricultural implements, and especially to harrows.

Its object is to enable a sectional harrow, similar to that patented to me on the 20th of May, 1890, No. 428,392, to be easily handled.

The invention resides in certain details of construction and arrangements of parts hereinafter described, and particularly pointed out in the claims.

In the drawings, Figure 1 is a plan. Fig. 2 is a sectional elevation on line 2 2, Fig. 1; and Figs. 3 and 4 are enlarged views of the connecting-bars between the sections.

I have shown the harrow as made up of five sections A A' $A^2$ $A^3$ $A^4$, though any odd number may be used. Each section is composed of a front and a rear cross-bar $a$, arranged parallel with each other and united by longitudinal rails $b$. The two outer rails are braced by bars $c$, while the inner rails are bent toward each other and united together about midway of their length. Sockets B are provided for the teeth C, the sockets consisting of flanged and perforated blocks fastened to the rails and cross-bars. The teeth are set inclining backwardly at an angle of from twenty-five degrees to forty degrees. They are preferably square in cross-section and are placed with one corner in front. This arrangement prevents any undue accumulation of débris on the teeth. The sections are all united at front and rear by coupling-bars D. These may be straight, but are preferably bowed, as shown in Fig. 3. The bars are made in two parts, which are fastened rigidly to the harrow sections, but are united by a loose connection, so as to permit some vertical play between the sections and allow the harrow to accommodate itself to the surface of the ground. The bars are preferably formed of channel-iron, as shown, for the sake of greater stiffness. The two parts $d$ $d'$ are pivotally connected by a rivet or bolt $d^2$, and one part has an eye $d^3$ through which the other passes loosely. In case it is desired to prevent any play between the sections shims or wedges can be inserted into the eyes $d^3$ to lock the parts $d$ $d'$ rigidly together. This will be found of advantage when the ground is rough or full of débris, since the harrow can then be readily lifted as a whole to clear the obstructions. Braces E also are inserted between the harrow sections, extending diagonally from one to the other. They consist of two parts $e$ $e'$, united by a loose connection, preferably made as follows: One part $e$ contains a horizontal slot $e^2$ and the other has a stud $e^3$ with a T-head arranged transverse to the length of the bar. By placing the parts $e$ $e'$ together at an angle the stud can be passed through the slot and will lock the parts together when they are brought into line. An eye $e^4$ on the part $e'$ is adapted to slip over the end of the part $e$ and keep them in place, though providing for a suitable amount of play, as in the case of the bars D. A doubletree F is connected with the three middle sections of the harrow by chains $f$ $f'$ $f^2$. To the doubletree are attached the singletrees or the draft-equalizer G. The doubletree F is normally at right angles with the line of draft. When it is desired to steer the harrow to the right or left, means are provided for pulling forward toward the end of the doubletree the corresponding end of the harrow. I prefer the arrangement shown in the drawings, in which a chain, rope, or wire G G' is attached to the end of the doubletree and runs back around a pulley $g$ $g'$, situated at some distance from the middle of the harrow and fastened to one of the rails $b$ or to some other suitable part. The chains run to a lever H, mounted on a universal joint $h$ in the frame H', secured to the rear of the central section A. I prefer to place the pulleys $g$ $g'$ near the rear of the harrow and to attach to the lever on each side a second chain I I', running obliquely forward to and around the pulleys $i$ $i'$, attached to the front of the harrow near where the chains G G' lie. The chains I I' pass under the chains G G', and rising from the pulleys are attached to said chains at points a little forward of the harrow. By moving the lever H laterally one or the other of the sets of chains G I G' I' will be tightened and that end of the harrow will be pulled forward toward the doubletree. This causes the harrow to swerve toward the other end of the doubletree—i. e., if the lever is moved to the left the harrow will swerve to the right, and vice versa. The chains run through eyes $h'$ in the lever H', which may be provided, if desired, with anti-friction sheaves or rollers. This enables me to produce a pull on the chains by a vertical movement of the lever as well as a lateral movement, and thus lift either the front or the rear of the harrow at will. To raise the front, the rear end of the lever is depressed, bringing a tension on the chains I I'. The chains G G' are kept tight, but no extra pull is exerted upon them by reason of their ends being attached to a traveler riding in the slot $g^2$ in the end of the lever. The chains I I' are similarly connected with the slot $i^2$, which is a little longer than the slot $g^2$; but the slots are so arranged that when the handle of the lever is depressed the traveler for the chains G G' will slip along the slot $g^2$, while the traveler for the chains I I', being at the lower end of its slot, cannot slip, and therefore the chains I I' will be taken in. This operates to pull down the chains G G' at the points where the chains I I' are attached to them, or, since the chains G G' are tight, the result is to tip up the front of the harrow. When the handle of the lever is raised, the operation of the slots $g^2$ $i^2$ is to tighten the chains G G' and slacken the chains I I' and $f f' f^2$, allowing the front of the harrow to dig into the ground and enabling the farmer to lift the rear of the harrow.

All the chains are adjustable by having extra links to enable them to be hooked up or let out when necessary. The chains G G' I I' are of such length as to be a little slack when the chains $f f' f^2$ are taut. The chains $f f' f^2$ can be attached to the doubletree at various points to regulate the draft.

Having thus described my invention, what I claim, and desire to secure by Letters Patent, is—

1. The combination, with the harrow-sections, of the coupling-bars, composed of two parts, rigidly united to the sections at one end and pivoted together at their other end, one of said parts having an eye loosely embracing the other part, whereby more or less vertical movement is permitted the sections.

2. The combination, with the harrow-sections, of the coupling-bars E, composed of two parts, rigidly united to the sections at one end and pivoted together at their other end, one of said parts $e$ having a slot $e^2$ and the other part $e'$ having a T-headed stud $e^3$ engaging with the slot, and an eye $e^4$ to receive the end of the part $e$, whereby more or less vertical movement is permitted the sections.

3. The combination, with a harrow, of a doubletree, a chain attached to each end of the doubletree, pulleys on the harrow, around which said chains run, and a lever for operating the chains, movable both vertically and laterally, substantially as described.

4. The combination, with a harrow, of a doubletree, and a chain G G', attached to each end of the doubletree, a chain I I', attached to the chains G G' in front of the harrow, pulleys $g$ $g'$ $i$ $i'$, attached to the harrow and receiving the chains, and a lever H at the rear of the harrow for operating said chains, substantially as described.

5. The combination, with the harrow, of the doubletree, the chains G G' I I', and the operating-lever H, mounted on a universal joint, substantially as described.

6. The combination, with a harrow, of the lever H, mounted on a universal joint and having the slots $g^2$ $i^2$, the chains G G' I I', attached to the travelers, riding in said slots, and the doubletree, to which said chains are fastened, substantially as described.

In testimony whereof I affix my signature in presence of two witnesses.

JOHN H. HANSON.

Witnesses:
EDWARD MITCHELL,
GUSTAF WEINNERBERG.